United States Patent
Yoon

[11] Patent Number: 6,091,541
[45] Date of Patent: Jul. 18, 2000

[54] MULTICHANNEL 3-STAGE OPTICAL FIBER AMPLIFIER

[75] Inventor: Soo-young Yoon, Kunpo, Rep. of Korea

[73] Assignee: SamSung Electronics Co., Ltd., Kyungki-do, Rep. of Korea

[21] Appl. No.: 09/138,517

[22] Filed: Aug. 24, 1998

[30] Foreign Application Priority Data

Aug. 25, 1997 [KR] Rep. of Korea ............... 40710/1997

[51] Int. Cl.[7] ........................................ H01S 03/00
[52] U.S. Cl. ............................ 359/341; 359/124
[58] Field of Search .................... 359/341, 124

[56] References Cited

U.S. PATENT DOCUMENTS

| | | | |
|---|---|---|---|
| 5,452,116 | 9/1995 | Kirkby et al. . | |
| 5,519,796 | 5/1996 | Li et al. | 385/24 |
| 5,532,864 | 7/1996 | Alexander et al. | 359/177 |
| 5,675,432 | 10/1997 | Kosaka | 359/341 |
| 5,706,125 | 1/1998 | Nakano | 359/341 |
| 5,864,423 | 1/1999 | Kosaka | 359/341 |
| 5,912,750 | 6/1999 | Takeda et al. | 359/124 |
| 5,933,270 | 8/1999 | Toyohara | 359/341 |

FOREIGN PATENT DOCUMENTS

| | | |
|---|---|---|
| 0766 423 A2 | 4/1997 | European Pat. Off. . |
| 5-37472 | 2/1993 | Japan . |
| 7-64134 | 3/1995 | Japan . |
| 8-125634 | 5/1996 | Japan . |
| 8-278523 | 10/1996 | Japan . |
| 9-107141 | 4/1997 | Japan . |
| 9-93200 | 4/1997 | Japan . |
| 9-148659 | 6/1997 | Japan . |
| 9-191303 | 7/1997 | Japan . |
| 9-326519 | 12/1997 | Japan . |
| 10-107352 | 4/1998 | Japan . |
| 10-276172 | 10/1998 | Japan . |
| 10-294510 | 11/1998 | Japan . |

OTHER PUBLICATIONS

Ariga, et al., Proceedings of the 1997 IEICE General Conference, Mar. 1997, the Institute of Electronics, Information and Communication Engineers.

*Primary Examiner*—Mark Hellner
*Attorney, Agent, or Firm*—Robert E. Bushnell, Esq.

[57] ABSTRACT

A multichannel 3-stage optical fiber amplifier includes a first amplification unit for amplifying an input multichannel multiplexed signal light, a gain equalization unit for equalizing gains for each channel by causing a different amount of loss for each channel in the amplified signal light having a different gain at each channel by the first amplification unit, and a second amplification unit for amplifying the signal light output from the gain equalization unit. Thus, an equalized gain with respect to each channel wavelength can be obtained by a gain equalization unit placed between two amplifiers. Also, signal-to-noise ratio performance can be improved by removing spontaneous emission noise using a wavelength divider.

23 Claims, 3 Drawing Sheets

MULTICHANNEL 3-STAGE OPTICAL FIBER AMPLIFIER

CLAIM OF PRIORITY

This application makes reference to, incorporates the same herein, and claims all benefits accruing under 35 U.S.C. §119 from an application for MULTICHANNEL 3-STAGE OPTICAL FIBER AMPLIFIER earlier filed in the Korean Industrial Property Office on Aug. 25, 1997 and there duly assigned Ser. No. 40710/1997.

BACKGROUND OF THE INVENTION

1. Technical Field

The present invention relates to an optical fiber amplifier and, more particularly, to a multichannel 3-stage optical fiber amplifier.

2. Related Art

The greatest merit of an optical transmission network is the capability of transmitting much data information over a greater distance. However, when a signal light is transmitted hundreds of kilometers or farther, a loss of 10 dB or more occurs in multiple of 10 km, even when using an optical fiber having a loss of 0.2 dB/Km per length unit. Thus, amplifiers which compensate for this loss must be used for light transmission.

An electronic amplifier using an optical-to-electrical, electrical-to-optical converter prevents signal noise and reproduces a waveform. However, the electronic amplifier limits the speed of an optical transmission network due to delay time as well as low processing speed required for signal restoration. Therefore, a technique for amplifying a signal light directly as light is required. An erbium doped fiber amplifier (EDFA), obtained by adding a rare-earth metal such as erbium (Er) to a general optical fiber, is widely used as the above-described fiber-direct amplifier because of its simple structure and relatively excellent performance.

However, when a wavelength division multiplexing (WDM) method, in which signals are carried on different wavelengths and signals of several channels are transmitted simultaneously, is used to transmit large amount of information via a single optical fiber, certain characteristics—particularly, gain and noise—must have a constant value at every wavelength of each channel in the EDFA. That is, in the WDM EDFA, the power of an input signal increases in proportion to the number of channels, as compared to the other single channel EDFAs. For example, an EDFA (in-line EDFA) used as a single channel repeater usually receives an input signal of about −20 dBm, but an 8-channel WDM EDFA receives −20 dBm for each channel, providing a total input power of −11 dBm. However, the entire saturation output power of the EDFA is constant so that output power for each channel is reduced, and the entire gain or the gain for each channel is accordingly reduced.

The EDFA amplifies the input signal, and simultaneously adds spontaneous emission noise to signals of other wavelengths. When a signal passes through several EDFAs during long distance transmission, the spontaneous emission noise is amplified and accumulated with the signal. The thus-accumulated noise degrades the signal-to-noise ratio, and is input to an amplifier with the signal. Thus, population inversion within an optical amplification fiber is reduced, thereby reducing the amplification factor of the original signal.

It is impossible to presume how many channels, among the input channels of a WDM EDFA, the input signal enters. The number of channels input to the amplifier can vary with the number of channels added or dropped. The entire power of the input signal varies depending on the number of input channels, so that the total gain of the EDFA can also be changed.

There are several methods of equalizing gain and noise according to wavelength in an EDFA: (1) changing the composition of an optical amplification fiber by adding aluminum (Al), ytterbium (Yb) and samarium (Sm) to the optical fiber, or changing the characteristics of the optical amplification fiber using a fluorite optical fiber instead of an optical fiber based on silica; (2) attaching, to an existing EDFA, a Mach-Zehnder filter, an acoustic filter, a Fabric/Perot filter and a filter such as a fiber grating; (3) connecting EDFAs having different characteristics to each other.

However, these methods increase the size and cost of the EDFA, and cannot remove the aforementioned emission noise.

SUMMARY OF THE INVENTION

To solve the above problems, it is an objective of the present invention to provide a multichannel 3-stage optical fiber amplifier for obtaining equalized gains at each wavelength by installing a gain equalizer between two amplification units, this prevents stimulated emission noise to be added from being accumulated at amplification ends, even when passing through several amplification ends during long distance transmission, with a WDM optical fiber amplifier having an equalized gain and large output power with respect to a multichannel signal.

Accordingly, to achieve the above objective, there is provided a multichannel 3-stage optical fiber amplifier comprising: a first amplification unit for amplifying input multichannel multiplexed signal light; a gain equalization unit for equalizing gains for each channel by causing a different amount of loss for each channel in the amplified signal light having a different gain at each channel by the first amplification unit; and a second amplification unit for amplifying the signal light output from the gain equalization unit.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENT

Figure 1:
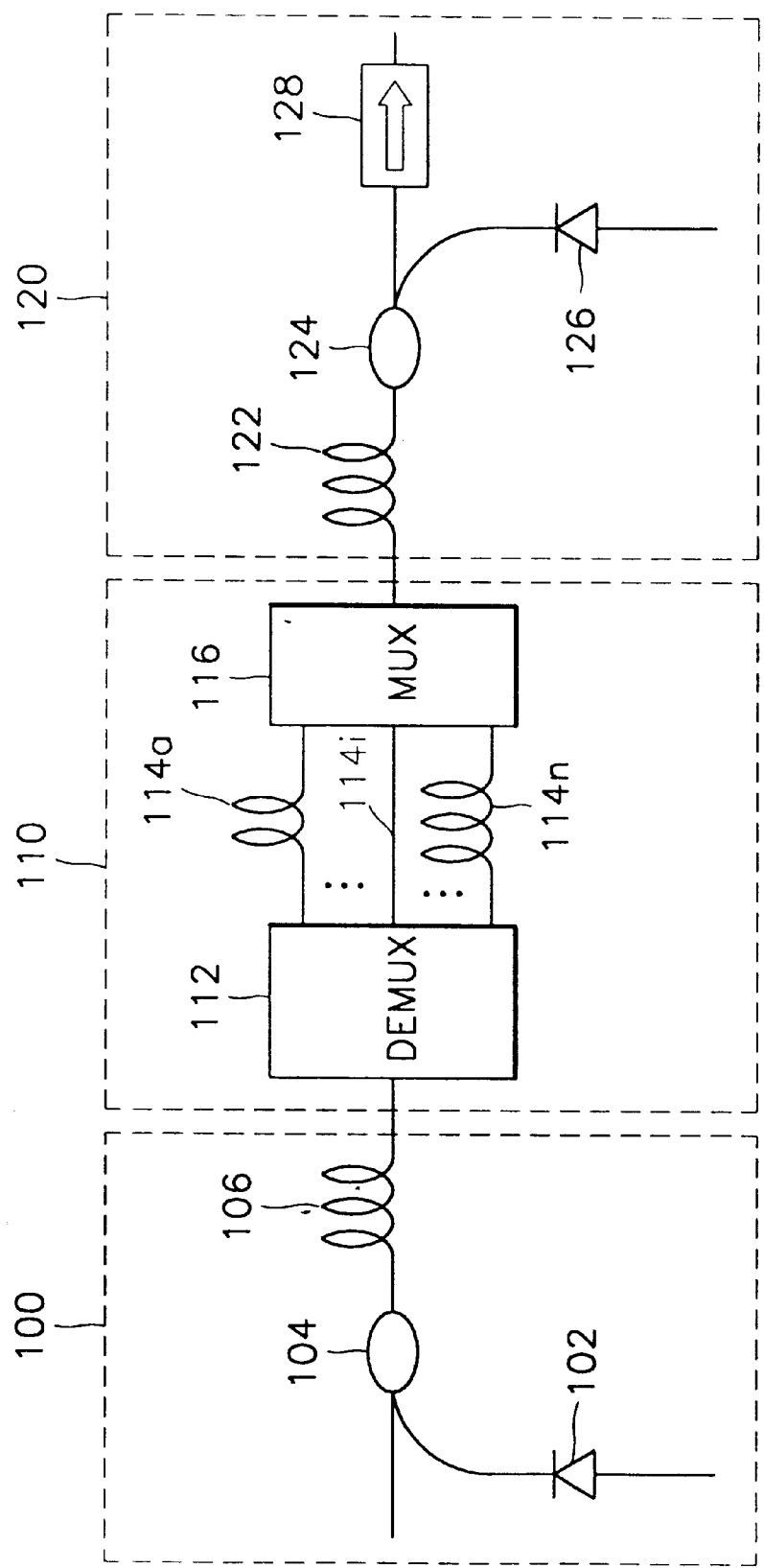
FIG. 1 is a block diagram illustrating the structure of a multichannel 3-stage optical fiber amplifier according to the present invention.

Referring to FIG. 1, a multichannel 3-stage optical fiber amplifier is comprised of a first amplification unit 100, a gain equalization unit 110 and a second amplification unit 120.

The first amplification unit 100 is comprised of a first pump laser diode (LD) 102 for generating a pump light, a first wavelength division multiplication (WDM) coupler 104 for providing input signal light in response to the pump light, and a first erbium doped fiber (EDF) 106 for amplifying the input signal light.

The gain equalization unit 110 is comprised of an optical wavelength demultiplexer (DEMUX) 112 for demultiplexing the amplified input signal light into several channels according to wavelength, an EDF unit having EDFs 114*a* through 114*n* of different lengths, and a multiplexer (MUX) 116 for multiplexing several channels into one channel to provide output signal light.

The second amplification unit 120 is comprised of a second EDF 122 for amplifying the output signal light of the gain equalization unit 110, a second WDM coupler 124, a second pump LD 126, and an isolator 128 for preventing reflection light applied from an output port.

The operation of the present invention having such a configuration is as follows. First, pump light having a wavelength of 980 nm produced by the first pump LD 102 excites the first EDF 106 via the first WDM coupler 104. In the same way, a multiplexed multichannel signal light attenuated due to long distance transmission passes through the first WDM coupler 104 while proceeding in the same direction as the pump light, and is amplified by the first EDF 106, to have a high gain. The first EDF 106 amplifies not only the input signal light but also stimulated emission noise generated at its front end, and adds its own noise to the result.

The DEMUX 112 removes stimulated emission noise by passing only signal light having a selected wavelength in the light output from the first EDF 106. Signals according to different channels are outputted from the DEMUX 112 via different optical fibers, and these signals sustain a loss of a predetermined value by virtue of the EDF unit (EDFs 114*a* through 114*n*) unexcited. The EDF generally amplifies an input signal light of a 1550 nm wavelength band when an excited pump light is applied thereto. Conversely, when the pump light is not applied, the signal light suffers a loss of about several dBm according to the concentration of added erbium (Er). Since signals input to the EDFs 114*a* through 114*n* and having different lengths suffer different losses, the gain of the signal light at each channel is equalized. That is, signal light having the smallest gain among the signal lights at every channel passes through the optical fiber 114*i* without loss, while signal lights passing through the remaining EDFs suffer losses on the basis of the above-described smallest gain for the purpose of gain equalization. These signal lights, transmitted via the respective optical fibers, are multiplexed by the MUX 116, and the multiplexed signal light is transmitted via an optical fiber.

The signal light passed through the MUX 116 is again amplified by the second excited EDF 122 to obtain a high gain and high output power. At this point, a 980 nm-wavelength pump light produced by the second pump LD 126 passes through the second WDM coupler 124 and excites the second EDF 122. The amplified signal light is transmitted to a next port via the isolator 128, which prevents a reflection light from being introduced via the output port of the second amplification unit 120.

Figure 2:
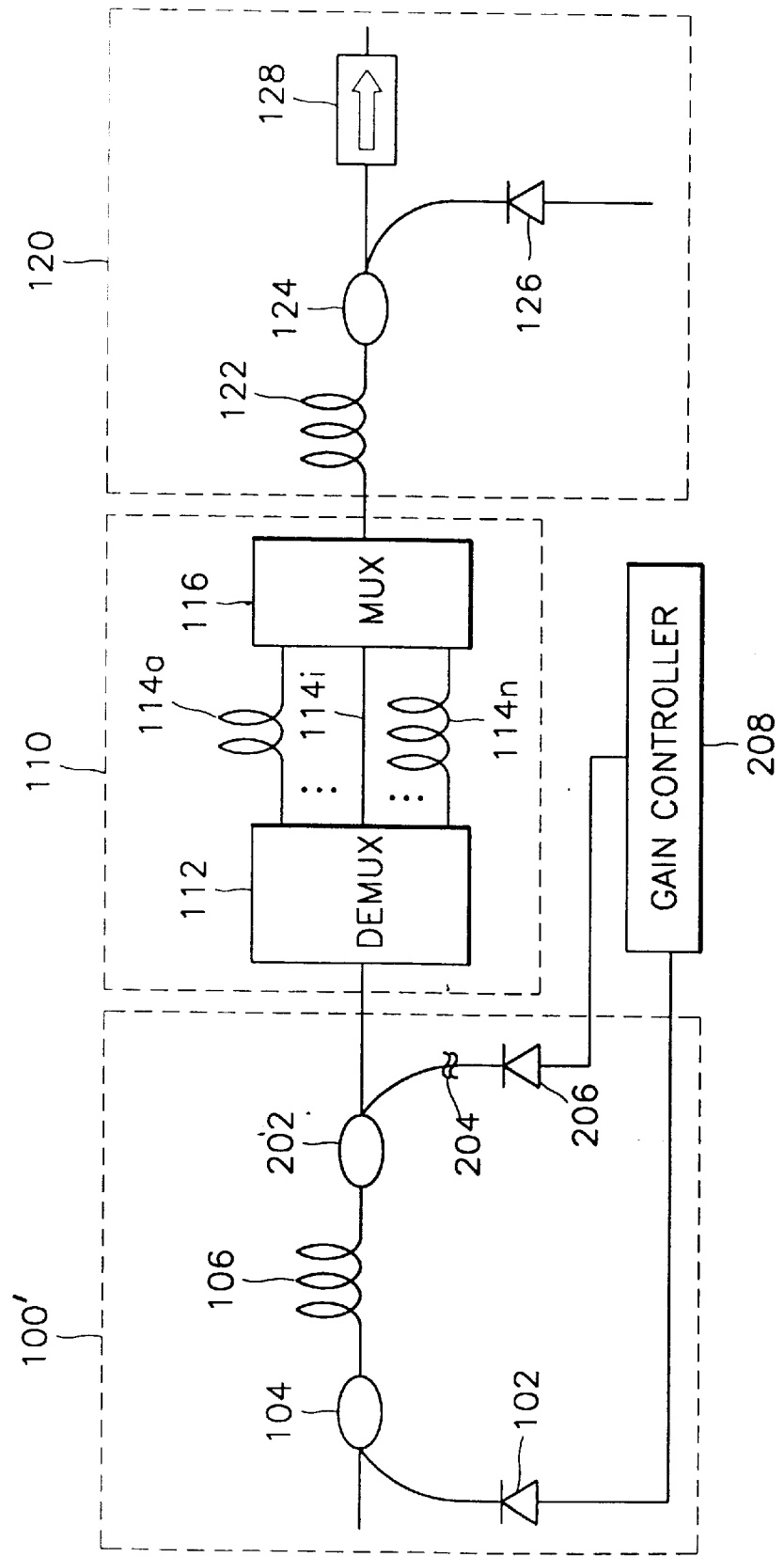
FIG. 2 is a block diagram illustrating a gain controller provided in the first amplification unit of FIG. 1.

FIG. 2 is a block diagram of the structure of the multichannel 3-stage optical fiber amplifier, further comprising a gain controller connected to the first amplification unit of FIG. 1. Referring to FIG. 2, the 3-stage optical fiber amplifier has a first amplification unit 100' constituted by adding a first coupler 202, a filter 204, a photodiode 206, and a gain controller 208 to the first amplification unit 100 of FIG. 1. Here, the photodiode 206 is an optical-to-electrical conversion device for converting an optical signal into an electric signal. The other components are the same as those of FIG. 1.

The operation of the multichannel 3-stage optical fiber amplifier of FIG. 2 is as follows. A signal light amplified by the first EDF 106 is separated at a ratio of 99 to 1 by the first coupler 202, and 99% of the signal light is input to the DEMUX 112. The filter 204, having a wavelength other than the wavelength of the signal light as its center wavelength, extracts light having a wavelength other than the signal wavelength from the residual 1% of the signal light. The optical-to-electrical converting device 206 converts the output light of the filter 204 into an electrical signal. The number of input channels is monitored according to the amplitude of the converted signal. This is based on the fact that the size of amplified spontaneous emission is inversely proportional to the number of input channels in an optical fiber amplifier. The aforementioned converted signal is monitored by the gain controller 208, and the pumping levels of the first and second pump LDs 102 and 126 are controlled by the gain controller 208 according to the monitored number of input channels, thereby controlling the entire amplification gain.

Figure 3:
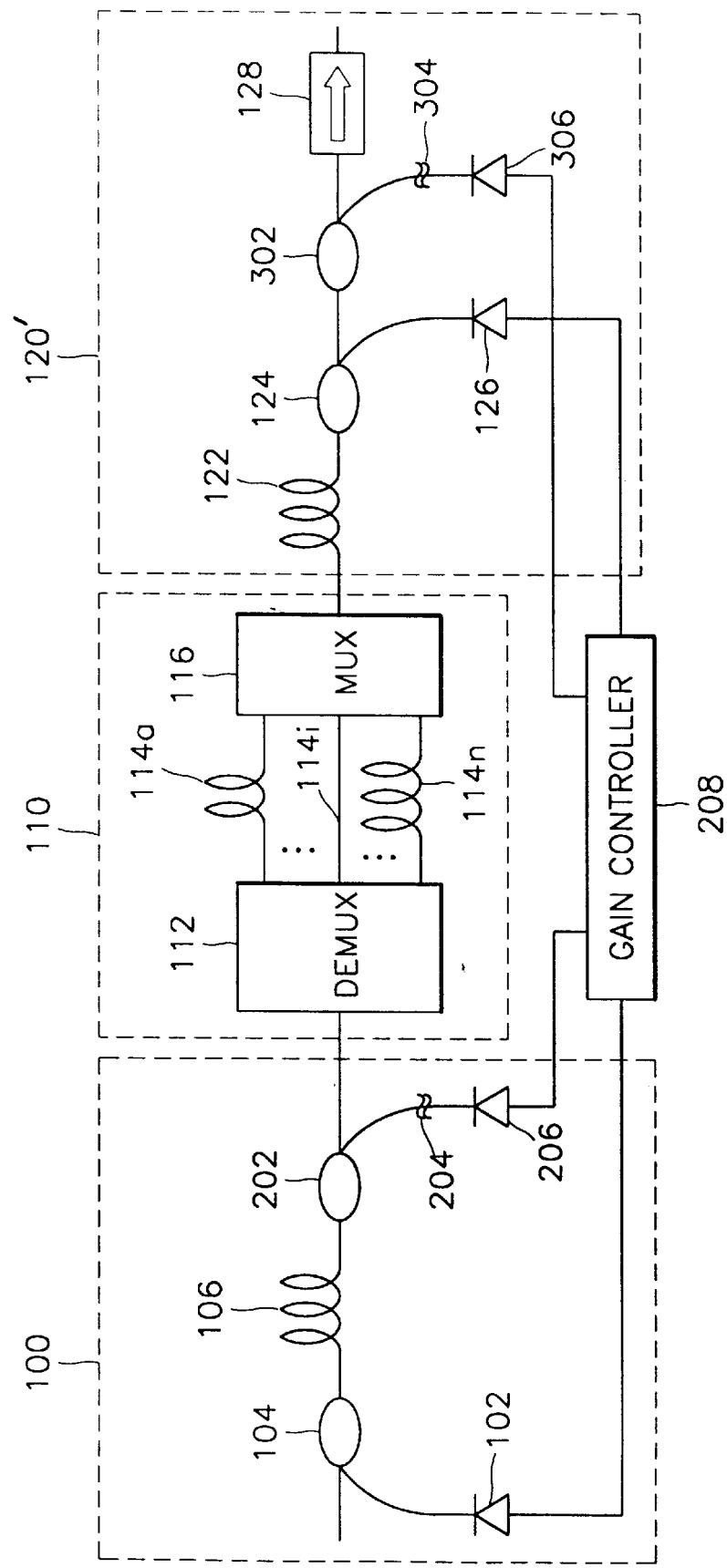
FIG. 3 is a block diagram illustrating a gain controller provided in the second amplification unit of FIG. 2.

FIG. 3 shows the structure of a multichannel 3-stage optical fiber amplifier further comprising a gain controller connected to the second amplification unit of FIG. 2. Referring to FIG. 3, the 3-stage optical fiber amplifier has a second amplification unit 120' constituted by adding a second coupler 302, a second filter 304, a second photodiode 306, and a gain controller 308 to the second amplification unit 120 of FIG. 2. Here, the second photodiode 306 is an optical-to-electrical conversion device for converting an optical signal into an electric signal. The other components are the same as those of FIG. 2.

The operation of the multichannel 3-stage optical fiber amplifier of FIG. 3 is as follows. A signal light, amplified by the second EDF 122 and passed through the second WDM coupler 124, is separated at a ratio of 99 to 1 by the second coupler 302, and 99% of the signal light is input to the isolator 128. The second filter 304, having a wavelength other than the wavelength of the signal light as its center wavelength, extracts light having a wavelength other than the signal wavelength from the residual 1% of the signal light. The second optical-to-electrical converting device 306 converts the extracted light into an electrical signal. The converted signal is monitored by the gain controller 308, and the pumping levels of the first and second pump LDs 102 and 126 are controlled by the gain controller 308 according to the result of the monitoring, thereby controlling the entire amplification gain.

According to the present invention, an equalized gain with respect to each channel wavelength can be obtained by a gain equalizer placed between two amplifiers. Also, signal-to-noise ratio can be improved by removing spontaneous emission noise using a wavelength demultiplexer. Furthermore, spontaneous emission at the output ports of the first and second amplification units is monitored, and the gain of the optical fiber amplifier is controlled according to the result of the monitoring, thereby obtaining more stable results of amplification.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A multichannel 3-stage optical fiber amplifier, comprising:

first amplification means for amplifying input multichannel multiplexed signal light to provide amplified signal light;

gain equalization means for equalizing gains by causing a different amount of loss for each of a plurality of channels of the amplified signal light to provide a signal light output; and second amplification means for amplifying the signal light output from the gain equalization means;

wherein said second amplification means comprises:

an erbium doped filter (EDF) for amplifying the signal light output of the gain equalization means;

a first coupler connected to said EDF for outputting amplified signal light from the EDF;

a second coupler connected to said first coupler for dividing the amplified signal light in accordance with a predetermined ratio; and a filter connected to said second coupler for extracting a signal light having a wavelength out of a wavelength range of a multichannel signal light from one part of the amplified signal light divided by said second coupler to provide an output of said filter.

2. The multichannel 3-stage optical fiber amplifier as claimed in claim 1, wherein the first amplification means comprises:

a pump laser diode (LD) for producing a pump light;

a wavelength division multiplexing (WDM) coupler for coupling the input signal light and the pump light from the pump LD to produce output light; and an erbium doped fiber (EDF) for amplifying the output light of the WDM coupler.

3. The multichannel 3-stage optical fiber amplifier as claimed in claim 2, said first amplification means further comprising:

a coupler for dividing the amplified output light from the EDF at a predetermined ratio;

a filter for extracting light having a wavelength other than a wavelength of a multichannel signal light from a part of the amplified output light divided by the coupler;

an optical-to-electrical conversion unit for converting the output of the filter into an electrical signal and providing an output signal; and a gain control unit for controlling the output of the pump LD according to the amplitude of the output signal of the optical-to-electrical conversion unit.

4. The multichannel 3-state optical fiber amplifier as claimed in claim 3, wherein the optical-to-electrical conversion unit is a photodiode.

5. A multichannel 3-stage optical fiber amplifier, comprising:

first amplification means for amplifying input multichannel multiplexed signal light to provide amplified signal light;

gain equalization means for equalizing gains by causing a different amount of loss for each of a plurality of channels of the amplified signal light to provide a signal light output; and second amplification means for amplifying the signal light output from the gain equalization means;

wherein the second amplification means comprises:

an erbium doped filter (EDF) connected to an output of said gain equalization means for receiving and amplifying the signal light output of the gain equalization means;

a wavelength division multiplexing (WDM) coupler having an input and an output, said input being connected to an output of said EDF for outputting a signal light amplified by the EDF at said output of said WDM coupler; and a pump laser diode (LD) having an output connected to said output of said WDM coupler for providing pump light thereto;

wherein said WDM coupler transmits the pump light to said EDF via said input of said WDM coupler and said output of said EDF.

6. The multichannel 3-stage optical fiber amplifier as claimed in claim 5, said second amplification means further comprising an isolator connected to the WDM coupler to prevent reflection light from being introduced via an output port.

7. The multichannel 3-stage optical fiber amplifier as claimed in claim 5, said second amplification means further comprising:

a coupler for dividing an amplified light via the WDM coupler at a predetermined ratio;

a filter for extracting a signal light having a wavelength out of a wavelength range of a multichannel signal light from one part of a signal light divided by the WDM coupler to provide an output;

an optical-to-electrical conversion unit for converting the output of the filter into an electrical signal; and a gain control unit for controlling the pump light from the pump LD according to the amplitude of the electrical signal from the optical-to-electrical conversion unit.

8. The multichannel 3-stage optical fiber amplifier as claimed in claims 7, wherein the optical-to-electrical conversion unit is a photodiode.

9. The multichannel 3-stage optical fiber amplifier as claimed in claim 8, said second amplification means further comprising an isolator connected to an output of the coupler to prevent a reflection light from being introduced via an output port.

10. A multichannel 3-stage optical fiber amplifier, comprising:

first amplification means for amplifying input multichannel multiplexed signal light to provide amplified signal light;

gain equalization means for equalizing gains by causing a different amount of loss for each of a plurality of channels of the amplified signal light to provide a signal light output; and second amplification means for amplifying the signal light output from the gain equalization means;

wherein the gain equalization means comprises:

an optical wavelength demultiplexer for demultiplexing the amplified signal light from the first amplification means according to each of a plurality of wavelengths thereof to provide a plurality of output signal lights;

an optical fiber unit for causing a predetermined gain loss in each of the output signal lights from the optical wavelength demultiplexer to provide output signal light; and an optical multiplexer for multiplexing the output signal light from the optical fiber unit.

11. The multichannel 3-stage optical fiber amplifier as claimed in claim 10, wherein the optical fiber unit is comprised of optical fibers having different lengths depending on each of a plurality of output channels for equalizing an entire gain on the basis of a smallest gain among the gains of the output signal lights from the optical wavelength demultiplexer.

12. The multichannel 3-stage optical fiber amplifier as claimed in claim 11, wherein the optical fiber of the optical fiber unit is an erbium doped optical fiber.

13. The multichannel 3-stage optical fiber amplifier as claimed in claim 10, wherein the first amplification means comprises:
   a pump laser diode (LD) for producing a pump light;
   a wavelength division multiplexing (WDM) coupler for coupling the input signal light and the pump light from the pump LD to produce output light; and
   an erbium doped fiber (EDF) for amplifying the output light of the WDM coupler.

14. The multichannel 3-stage optical fiber amplifier as claimed in claim 13, said first amplification means further comprising:
   a coupler for dividing the amplified output light from the EDF at a predetermined ratio;
   a filter for extracting light having a wavelength other than a wavelength of a multichannel signal light from a part of the amplified output light divided by the coupler;
   an optical-to-electrical conversion unit for converting the output of the filter into an electrical signal and providing an output signal; and
   a gain control unit for controlling the output of the pump LD according to the amplitude of the output signal of the optical-to-electrical conversion unit.

15. The multichannel 3-stage optical fiber amplifier as claimed in claim 10, wherein the second amplification means comprises:
   a pump LD for producing a pump light;
   an EDF for amplifying the signal light output of the gain equalization means; and
   a WDM coupler for transmitting the pump light from the pump LD to the EDF and for outputting a signal light amplified by the EDF.

16. The multichannel 3-stage optical fiber amplifier as claimed in claim 15, said second amplification means further comprising an isolator connected to the WDM coupler to prevent reflection light from being introduced via an output port.

17. The multichannel 3-stage optical fiber amplifier as claimed in claim 15, said second amplification means further comprising:
   a coupler for dividing an amplified light via the WDM coupler at a predetermined ratio;
   a filter for extracting a signal light having a wavelength out of a wavelength range of a multichannel signal light from one part of a signal light divided by the WDM coupler to provide an output;
   an optical-to-electrical conversion unit for converting the output of the filter into an electrical signal; and
   a gain control unit for controlling the pump light from the pump LD according to the amplitude of the electrical signal from the optical-to-electrical conversion unit.

18. The multichannel 3-stage optical fiber amplifier as claimed in claim 17, said second amplification means further comprising an isolator connected to an output of the coupler to prevent a reflection light from being introduced via an output port.

19. The multichannel 3-stage optical fiber amplifier as claimed in claim 1, wherein said second amplification means further comprises a pump laser diode (LD) connected to said first coupler for producing a pump light.

20. The multichannel 3-stage optical fiber amplifier as claimed in claim 19, further comprising a gain control unit for controlling the pump light from the pump LD.

21. The multichannel 3-stage optical fiber amplifier as claimed in claim 1, wherein said second amplification means further comprises an optical-to-electrical conversion unit connected to said filter for converting the output of said filter into an electrical signal.

22. The multichannel 3-stage optical fiber amplifier as claimed in claim 21, further comprising a gain control unit connected to said optical-to-electrical conversion unit for receiving the electrical signal.

23. The multichannel 3-stage optical fiber amplifier as claimed in claim 22, wherein said second amplification means further comprises a pump laser diode (LD) connected between said gain control unit and said first coupler for producing a pump light, said gain control unit controlling the pump light from the pump (LD) according to the amplitude of the electrical signal from the optical-to-electrical conversion unit.

* * * * *